United States Patent
Iwakoshi et al.

(10) Patent No.: US 9,256,184 B2
(45) Date of Patent: Feb. 9, 2016

(54) BELT CONVEYANCE APPARATUS AND IMAGE FORMING APPARATUS HAVING AN ENDLESS BELT

(71) Applicant: CANON KABUSHIKI KAISHA, Tokyo (JP)

(72) Inventors: Tomoyuki Iwakoshi, Suntou-gun (JP); Atsushi Ogata, Mishima (JP); Hiroshi Kato, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 13/906,196

(22) Filed: May 30, 2013

(65) Prior Publication Data

US 2013/0322943 A1  Dec. 5, 2013

(30) Foreign Application Priority Data

Jun. 4, 2012 (JP) .................... 2012-127138

(51) Int. Cl.
| | |
|---|---|
| G03G 15/00 | (2006.01) |
| B65G 15/60 | (2006.01) |
| B65G 39/16 | (2006.01) |
| G03G 15/01 | (2006.01) |
| G03G 15/16 | (2006.01) |

(52) U.S. Cl.
CPC ............ *G03G 15/6529* (2013.01); *B65G 15/60* (2013.01); *B65G 39/16* (2013.01); *G03G 15/0131* (2013.01); *G03G 15/1615* (2013.01); *G03G 2215/00151* (2013.01)

(58) Field of Classification Search
CPC .......... G03G 2215/00143; G03G 2215/00151; B65G 15/60; B65G 15/64; B65G 39/16; B65G 15/62; B65H 2404/2511; B65H 2404/255; B65H 2404/25
See application file for complete search history.

(56) References Cited

U.S. PATENT DOCUMENTS

| | | | | |
|---|---|---|---|---|
| 3,246,736 A | * | 4/1966 | Lo Presti ...................... | 198/827 |
| 3,693,781 A | * | 9/1972 | Homeier ....................... | 198/807 |
| 5,365,321 A | * | 11/1994 | Koshimizu et al. ........... | 399/329 |
| 6,970,674 B2 | * | 11/2005 | Sato et al. ..................... | 399/302 |
| 8,064,809 B2 | * | 11/2011 | Yamaguchi et al. .......... | 399/301 |

FOREIGN PATENT DOCUMENTS

| | | |
|---|---|---|
| JP | 11-79457 A | 3/1999 |
| JP | 11-079459 A | 3/1999 |

* cited by examiner

*Primary Examiner* — Justin Olamit
(74) *Attorney, Agent, or Firm* — Canon U.S.A., Inc., IP Division

(57) ABSTRACT

A rotating member provided on an end of a stretching member is rotatable around a rotating axis inclined with respect to the shaft of the stretching member. In order that, when a belt end winds around the rotating member, the belt end winds around an outer side of an entry position where the belt end enters the rotating member, an outer circumferential surface of the rotating member in an area in contact with an inner circumferential surface of the belt is inclined with respect to a belt contact surface.

11 Claims, 15 Drawing Sheets

BELT CONVEYANCE APPARATUS AND IMAGE FORMING APPARATUS HAVING AN ENDLESS BELT

BACKGROUND OF THE INVENTION

1. Field of the Invention

The present disclosure relates to a belt conveyance apparatus for rotationally moving an endless belt stretched by a plurality of stretching members, and an image forming apparatus including the belt conveyance apparatus, such as a printer and a copying machine employing an electrophotographic process.

2. Description of the Related Art

Some of conventional image forming apparatuses, such as printers and copying machines employing the electrophotographic process, utilize a belt conveyance apparatus for rotationally moving an endless belt stretched by a plurality of stretching members. Such belt conveyance apparatuses have a problem that, when rotationally moving the belt, the belt may shift toward one end in the width direction (the direction approximately perpendicularly intersecting with the rotational direction of the belt).

Japanese Patent Application Laid-Open No. 11-079459 discusses a technique for restricting a belt from moving in the width direction to adjust the lateral movement of the belt. This technique uses a drive roller and a driven roller for stretching the belt, and inclines the driven roller with respect to the drive roller around a shaft at the center in the width direction. Specifically, a frame for supporting both ends of a shaft of the driven roller is rotatable around a rotating shaft provided on the outer circumferential surface of the belt.

When the belt moves toward one end, the tension applied from the belt to a stretching roller at one end becomes larger than the tension at the other end. When the tension is unbalanced in this way, the one end of the stretching roller is pressed by the belt and accordingly the stretching roller tends to move so as to get away from the inner circumferential surface of the belt. Thus, the one end of the frame is lowered and the other end thereof is raised around the rotating shaft. As a result, the driven roller inclines with respect to the drive roller so as to move the belt toward the other end.

The technique discussed in Japanese Patent Application Laid-Open No. 11-079459 inclines the driven roller with respect to the drive roller to adjust the lateral movement of the belt, and therefore needs to rotate the frame supporting the shaft of the driven roller, around the rotating shaft on outer circumferential surface of the belt. This causes a problem of a complicated configuration.

SUMMARY OF THE INVENTION

The present application is directed to a belt conveyance apparatus for adjusting lateral movement of a belt with a simple configuration, and an image forming apparatus including the belt conveyance apparatus.

According to an aspect of the present disclosure, a belt conveyance apparatus includes an endless belt configured to be rotationally movable, a stretching member including a shaft and configured to contact an inner circumferential surface of the belt to stretch the belt, and an adjustment device configured to adjust a lateral movement of the belt in a width direction perpendicularly intersecting with a rotational direction of the belt, wherein the adjustment device includes a rotating member rotating in contact with the belt on at least one end of the stretching member in the width direction, a rotating axis of the rotating member being inclined with respect to the shaft of the stretching member, and wherein, when the belt shifts toward the one end in the width direction, a belt end on the one end of the belt winds around an outer side of a position where the belt end enters the rotating member so that the adjustment device moves the belt toward another end thereof.

According to another aspect of the present disclosure, an image forming apparatus includes an image bearing member configured to bear a toner image, and a transfer unit configured to transfer the toner image formed on the image bearing member onto a transfer material. The transfer unit includes an endless belt configured to be rotationally movable, a stretching member including a shaft and configured to contact an inner circumferential surface of the belt to stretch the belt, and an adjustment device configured to adjust lateral movement of the belt in a width direction perpendicularly intersecting with a rotational direction of the belt, wherein the adjustment device includes a rotating member rotating in contact with the belt on at least one end of the stretching member in the width direction, a rotating axis of the rotating member being inclined with respect to the shaft of the stretching member, and wherein, when the belt shifts toward the one end in the width direction, a belt end on the one end of the belt winds around an outer side of a position where the belt end enters the rotating member so that the adjustment device moves the belt toward another end thereof.

Further features and aspects of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings. The dimensions, materials, shapes, and relative positions of constituent parts described in the following exemplary embodiments are to be suitably modified depending on the configuration and various conditions of an apparatus to which the present invention is applied. Therefore, unless otherwise specified, the scope of the present invention is not limited to the exemplary embodiments described below.

(Overall Configuration of Image Forming Apparatus)

Figure 1:
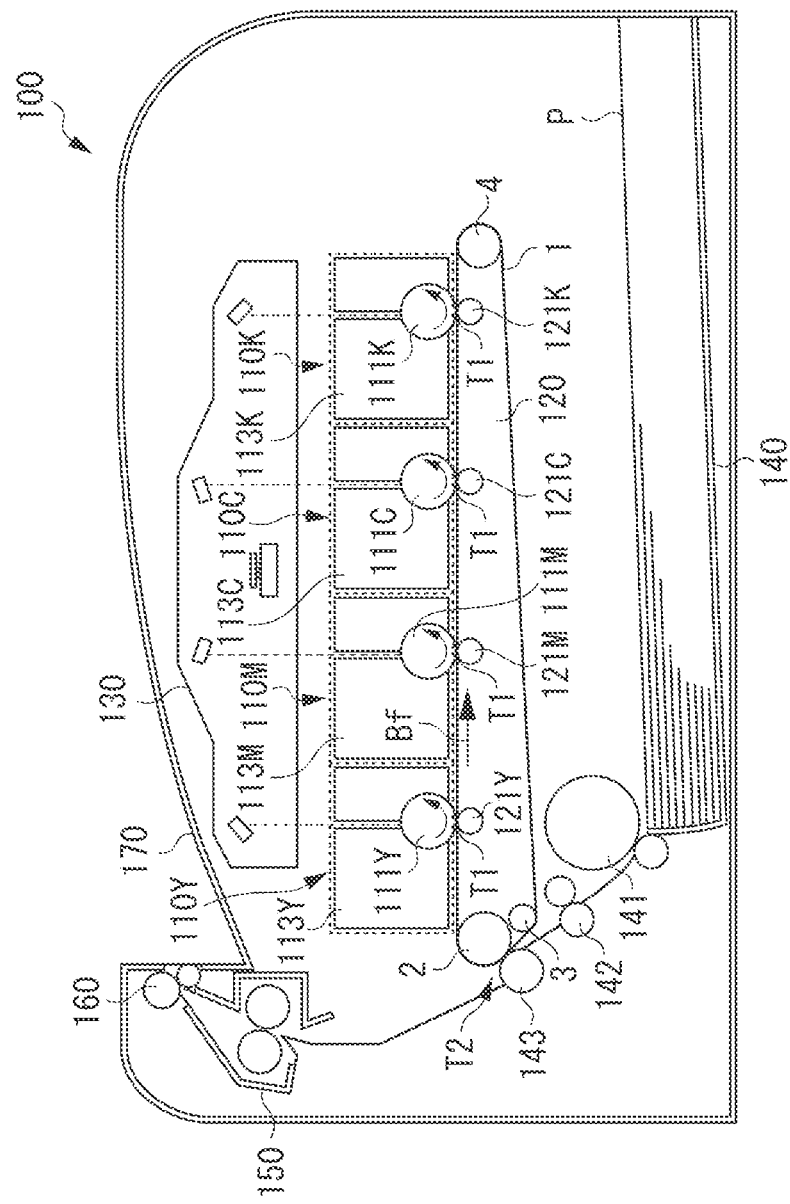
FIG. 1 is a schematic view illustrating an image forming apparatus according to exemplary embodiments disclosed herein.

FIG. 1 is a schematic view illustrating an example of a color image forming apparatus. A configuration of the image forming apparatus according to a first exemplary embodiment will be described below with reference to FIG. 1. An image forming apparatus 100 is capable of forming an image on a transfer material P, such as recording paper and an overhead projector (OHP) sheet by using the electrophotographic process according to a signal sent from an external apparatus such as a personal computer connected to be able to communicate with the image forming apparatus 100.

The image forming apparatus 100 includes a plurality of image forming units 110Y, 110M, 110C, and 110K for forming toner images of individual colors, yellow, magenta, cyan, and black, linearly disposed in the approximately horizontal direction. A transfer unit, which is a belt conveyance apparatus, is disposed to face the forming units 110Y, 110M, 110C, and 110K.

The transfer unit according to the present exemplary embodiment is an intermediate transfer unit 120 disposed to face the image forming units 110Y, 110M, 110C, and 110K and configured to move while rotating an endless belt (intermediate transfer belt) 1 as an intermediate transfer member. All of the image forming units 110Y, 110M, 110C, and 110K have an identical configuration and function, except for colors of toner images. Hereinafter, when distinction is not required in particular, an element belonging to any one of the image forming units 110Y, 110M, 110C, and 110K will be collectively described below by omitting subscripts Y, M, C, and K which are supplied to reference numerals in the drawings.

The image forming unit 110 form a toner image by using the well-known electrophotographic image forming process. Specifically, the image forming unit 110 includes a cylindrical electrophotographic photosensitive member (an image bearing member), i.e., a photosensitive drum 111 is provided rotatably in the direction of the arrow. In an image forming operation, a charging device (not illustrated) charges the surface of the rotating photosensitive drum 111. Then, a laser scanner 130 (an exposure device) emits light according to a signal sent from a computer, and scans and exposes the charged photosensitive drum 111 with the light to form an electrostatic latent image on the photosensitive drum 111. A developing unit 113 supplies toner (developing agent) to the electrostatic latent image formed on the photosensitive drum 111 to visualize the electrostatic latent image as a toner image. Thus, the toner image formed on the photosensitive drum 111 is electrostatically transferred onto the belt 1 at a primary transfer portion T1 by the action of a primary transfer roller 121, which is a primary transfer device disposed to face the photosensitive drum 111 via the belt 1.

In the above-described process, toner images respectively formed on the photosensitive drums 111 of the image forming units 110Y, 110M, 110C, and 110K are sequentially transferred onto the belt 1 in an overlapped way in synchronization with the movement of the belt 1, thus forming a color toner image.

In the meantime, in synchronization by a registration roller 142, the transfer material P sent out from a transfer material storage unit 140 by a pickup roller 141 is conveyed to a contact portion (a secondary transfer portion) T2 where a secondary transfer roller 143 (a secondary transfer device) contacts the belt 1. Thus, at the secondary transfer portion T2, the toner image formed on the belt 1 is electrostatically transferred onto the transfer material P by the action of the secondary transfer roller 143. Subsequently, the transfer material P is detached from the belt 1 and then conveyed to a fixing unit 150 which applies pressure and heat to the toner image on the transfer material P to firmly fix the toner image onto the transfer material P. Then, the transfer material P is conveyed by a discharge roller 160 and then discharged onto a discharge tray 170.

With the image forming apparatus 100 according to the present exemplary embodiment, the intermediate transfer unit 120 (a transfer unit) is also detachably attached to the image forming apparatus 100. Specifically, the belt conveyance apparatus is detachably attached to the image forming apparatus 100. Further, the photosensitive drum 111 and the developing device 113 of the image forming unit 110 may be integrated in a frame member as a process cartridge which is detachably attached to the image forming apparatus 100.

(Intermediate Transfer Unit)

Figure 2:
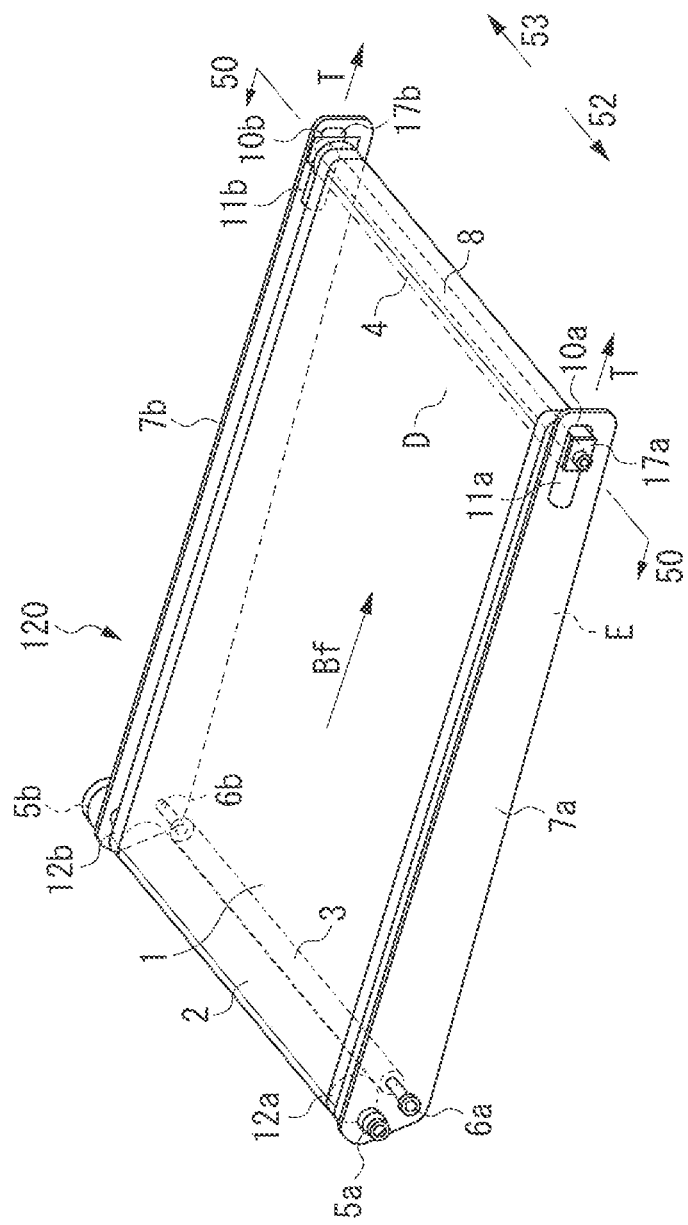
FIG. 2 is a perspective view illustrating the appearance of an intermediate transfer unit.

The following describes an overall configuration of the intermediate transfer unit 120 with reference to FIG. 2. FIG. 2 is a perspective view illustrating the appearance of the intermediate transfer unit 120 according to the present exemplary embodiment.

The intermediate transfer unit 120 includes the endless belt 1 and three different rollers (a drive roller 2 for driving the belt 1, a driven roller 3 driven by the belt 1, and a tension roller 4) which serve as stretching members for stretching the belt 1.

The drive roller 2 and the driven roller 3 are rotatably supported at both ends in the width direction by bearings 5 (5*a* and 5*b*) and bearings 6 (6*a* and 6*b*). The width direction refers to the direction which approximately perpendicularly intersects with the rotational direction of the belt 1. A first side plate 7*a* and a second side plate 7*b* support the bearings 5 (5*a* and 5*b*) and the bearings 6 (6*a* and 6*b*) for supporting the rollers 2 and 3. The drive roller 2 is rotated by the driving force transmitted from a drive source (not illustrated) provided in the image forming apparatus 100. When the drive roller 2 rotates, the belt 1 stretched by the drive roller 2 moves while rotating in the direction of the arrow Bf. As the drive roller 2 rotates the belt 1, the driven roller 3 is driven by the belt 1. The driven roller 3 is maintained approximately in parallel with the drive roller 2.

The tension roller 4 is held movably in the direction of the arrow T (the direction from the inner circumferential surface to the outer circumferential surface of the belt 1). Specifically, bearings 17 (17*a* and 17*b*) for rotatably supporting a tension roller shaft 8 is provided at both ends of the tension roller 4.

The bearings 17 (17a and 17b) are slidably held by bearing holding holes 10 (10a and 10b) having a long and thin shape formed on the first and second side plate 7a and 7b, respectively. The bearings 17 (17a and 17b) are urged by biasing springs 11 (11a and 11b), respectively, which are elastic members. This configuration urges the belt 1 from the inner circumferential surface to the outer circumferential surface, giving tension to the belt 1. When the drive roller 2 rotates the belt 1, the tension roller 4 is driven by the rotating belt 1.

On the outer circumferential surface, reinforcing tapes 12 (12a and 12b) as reinforcing members are provided in the vicinity of both ends in the direction (width direction) approximately perpendicularly intersecting with the rotational direction Bf. The reinforcing tapes 12 (12a and 12b) extend along the approximately entire circumference.

(Lateral Movement Adjustment Device)

Figure 3A:
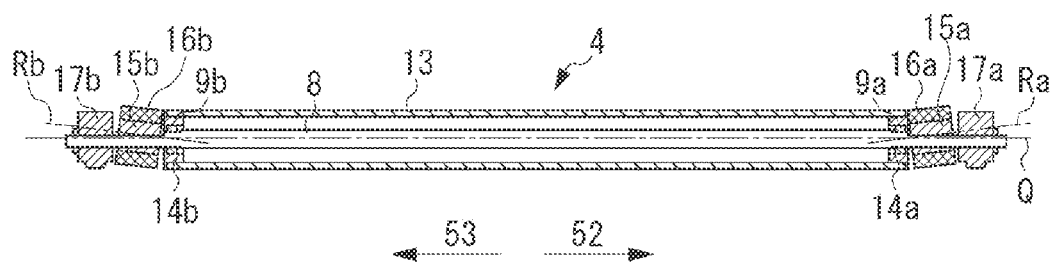
FIG. 3A is a cross sectional view illustrating a tension roller and its periphery taken along the arrows 50 in FIG. 2.
Figure 3B:
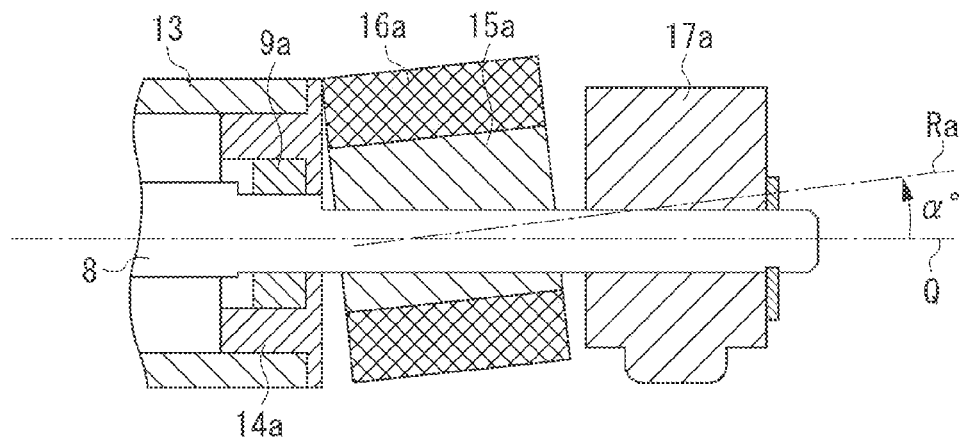
FIG. 3B is an enlarged view illustrating the right-hand side portion of the tension roller illustrated in FIG. 3A.
Figure 4:
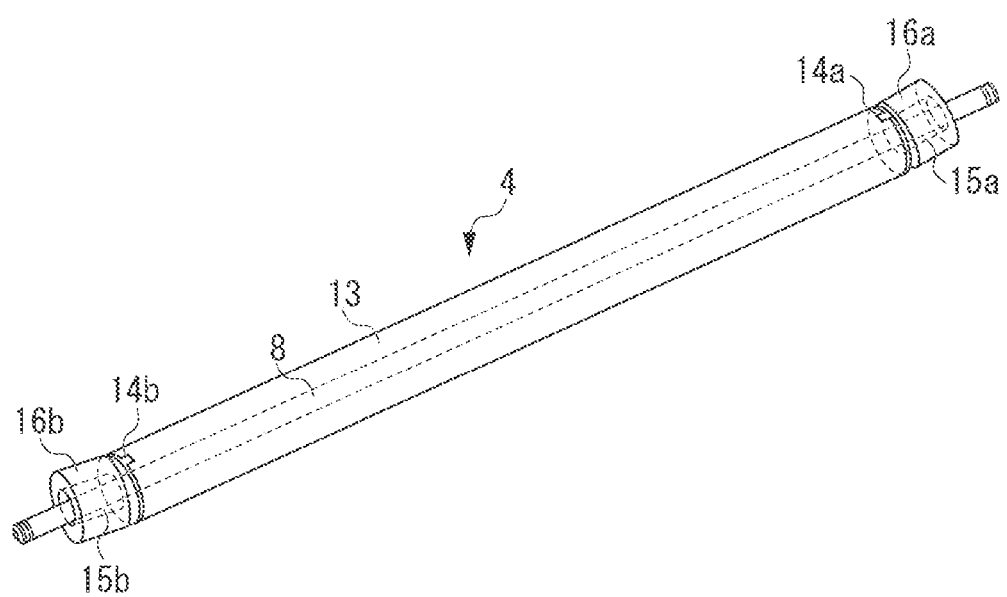
FIG. 4 is a perspective view illustrating a tension roller according to a first exemplary embodiment.

The following describes a configuration of a lateral movement restriction device according to the present exemplary embodiment with reference to FIGS. 2, 3, and 4. The lateral movement restriction device according to the present exemplary embodiment is a rotating member provided on at least one end of at least one stretching member out of the plurality of stretching members in the width direction.

FIG. 3A is a cross sectional view illustrating the tension roller 4 and its periphery taken along the arrows 50 in FIG. 2. FIG. 3B is an enlarged view illustrating the right-hand side portion (the side of the bearing holding hole 10a) of the tension roller 4 illustrated in 3A. FIG. 4 is a perspective view illustrating the tension roller 4. As illustrated in FIGS. 3A and 3B, the tension roller 4 includes a sleeve 13 (a belt supporting member) for supporting the inner circumferential surface of the belt 1, and a shaft led inside the sleeve 13. The sleeve 13 is rotatable around the tension roller shaft 8.

The belt 1 is wound around the outer circumferential surface of the sleeve 13 in an area in which the belt 1 contacts the tension roller 4. The sleeve 13 is a hollow cylindrical member. The outer circumferential surface of the sleeve 13 is a belt contact surface which contacts the inner circumferential surface of the belt 1. Flanges 14a and 14b (holding members for holding the sleeve 13) and the supporting portion bearings 9a and 9b are provided at both ends of the outer circumferential surface of the sleeve 13. The sleeve 13 is rotatably supported by the tension roller shaft 8 via the flanges 14a and 14b and the supporting portion bearings 9a and 9b.

The flanges 14a and 14b and the supporting portion bearings 9a and 9b are respectively engaged with each other, and integrally rotate. With this configuration, the sleeve 13 is rotated in the direction of the arrow Bf around the tension roller shaft 8 as a rotating axis Q. In this case, the tension roller shaft 8 is rotatably supported by the bearings 17a and 17b in a state that the tension roller shaft 8 is stopped rotating.

Further, at both ends of the sleeve 13 in the width direction and the bearings 17a and 17b, inclined roller shafts 15a and 15b are attached to the tension roller shaft 8 with a tilting angle of α° (α°=0.6 degrees) with respect to the tension roller shaft 8 in the direction of the arrow, in a state that the inclined roller shafts 15a and 15b are stopped rotating. As rotatable rotating members engaged with the inclined roller shafts 15a and 15b, inclined rollers 16a and 16b having a cylindrical shape with a fixed outer diameter are provided.

Therefore, the inclined rollers 16a and 16b are rotatable around the inclined roller shafts 15a and 15b as rotating shafts R (Ra and Rb), respectively. Specifically, the inclined rollers 16a and 16b are rotatable around the rotating shafts R different from the rotating axis Q of the sleeves 13 (Ra and Rb) as a rotating shaft. It is desirable that the innermost outer diameter of the inclined rollers 16a and 16b in the width direction is equal to or larger than the outer diameter of an end of the sleeve 13 in the width direction. If the innermost outer diameter of the inclined rollers 16a and 16b is smaller than an end of the sleeve 13, the belt 1 tends to easily bend at the boundaries between the inclined rollers 16a and 16b and the sleeve 13.

The inclined roller shafts 15 positioned by being engaged with the tension roller shaft 8 provide a higher positional accuracy than a case where the tension roller shaft 8 and the inclined roller shafts 15 are separately configured and positioned. It is also possible to integrally form the tension roller shaft 8 and the inclined roller shafts 15a and 15b to provide inclined portions directly on the tension roller shaft 8, enabling the inclined rollers 16a and 16b to rotate around the rotating shafts Ra and Rb, respectively.

In the present exemplary embodiment, when the belt 1 is shifted to one end in the width direction, lateral movement of the belt 1 is adjusted by generating a force in the direction opposite to the lateral movement direction to the belt 1 by using the inclined rollers 16a and 16b. The following describes a reason why the inclined rollers 16a and 16b returns the belt 1 shifted to one end to the other end in the width direction.

Figure 5:
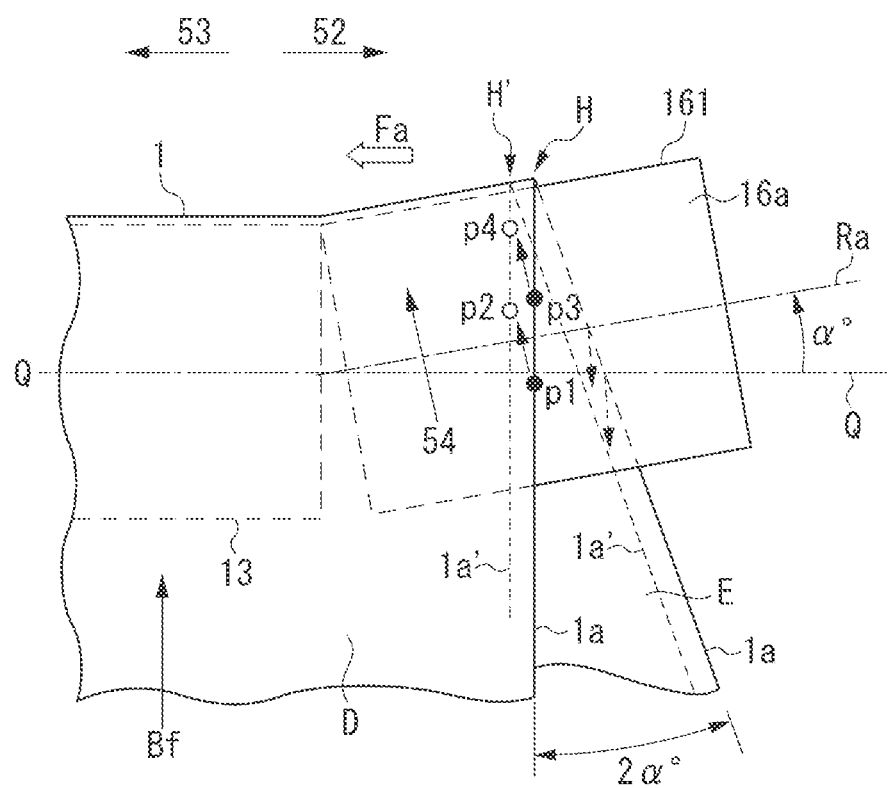
FIG. 5 illustrates a trace of the movement of a belt end according to the first exemplary embodiment.

FIG. 5 is an enlarged view illustrating the right-hand side portion of the tension roller 4 illustrated in FIGS. 3A and 3B, where the belt 1 winds around the inclined roller 16a. The reinforcing tape 12a, the inclined roller shaft 15a, and the tension roller shaft 8 are omitted to simplify the illustration.

As illustrated in FIG. 2, the belt 1 is stretched by the drive roller 2, the tension roller 4, and the driven roller 3. The drive roller 2 is rotated by a drive source (not illustrated). The drive roller 2 moves the belt 1 in the direction of the arrow Bf. The driven roller 3 and the tension roller 4 are driven by the belt 1. In this case, the D side of the belt 1 is the upstream side of the tension roller 4 in the rotational direction of the belt 1, and the E side is the downstream side of the tension roller 4 in the rotational direction thereof.

When the drive roller 2 is driven to rotate and move the belt 1, the belt 1 on the D side moves toward the tension roller 4 in the entry direction approximately in parallel with the rotational direction Bf. When the inclined roller 16a rotates in the direction of the arrow 54 around the rotating shaft Ra, an end 1a of the belt 1 rotates and moves while receiving a force from the inclined roller 16a, and thus, the end 1a of the belt 1 winds around the inclined roller 16a.

Then, the belt 1 moves toward the outer side in the width direction (the direction of the arrow 52 in FIG. 5) with a winding angle of about 2α°. Specifically, as illustrated in FIG. 5, the inclined roller 16a rotating around the rotating shaft Ra causes the end 1a of the belt 1 to wind around the outer side, in the width direction, of an entry position where the belt 1 enters the inclined roller 16a.

The following describes a trace of an edge 1a which is an end of the belt 1 with reference to FIG. 5. The inclined roller 16a rotates in the direction of the arrow 54. At a certain minute time, as the inclined roller 16a rotates, a point p1 on the edge 1a of the belt 1 on the D side moves to a point p2, and a point p3 moves to a point p4 in the rotational direction 54 of the inclined rollers 16a. Similarly, a point on the edge 1a on the E side moves in the rotational direction 54 of the inclined roller 16a. The edge 1a of the belt 1 moves to a position 1a'. As a result, the belt 1 has relatively moved in the direction of the arrow 53, from a position H to a position H'. This means that, at the portion where the belt 1 winds around the inclined roller 16a, a returning force Fa for moving the belt 1 in the direction of the arrow 53 is constantly generated by the inclined roller 16a.

The above description on the inclined roller 16a also applies to the inclined roller 16b on the opposite side. At the portion where the belt 1 winds around the inclined roller 16b, the belt 1 moves in the direction of the arrow 52 (toward the center in the width direction) based on the same principle as above.

Further, the returning forces Fa and Fb by the inclined rollers 16a and 16b vary with the amounts of winding W (W0 and Wa) of the belt 1 around the inclined roller 16. In a predetermined range, the larger the amounts of winding W of the belt 1, the larger the forces Fa and Fb. Although, in the present exemplary embodiment, the tilting angle of the inclined rollers 16a and 16b is set to 0.6 degrees ($\alpha° = 0.6°$), the optimum value of $\alpha$ differs according to the material of the belt 1 and the outer diameter of the inclined rollers 16a and 16b. Therefore, the tilting angle can be suitably changed depending on the configuration of the intermediate transfer unit 120.

Figure 6A:
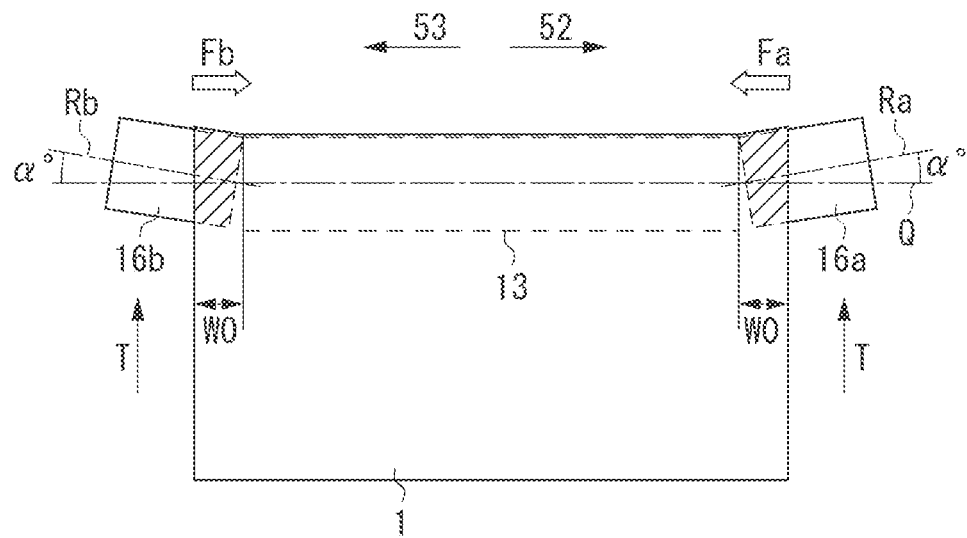
FIGS. 6A and 6B simply illustrate the amount of winding of the belt around a rotating member, and a relation between returning forces and a force causing the belt shift according to the first exemplary embodiment.
Figure 6B:
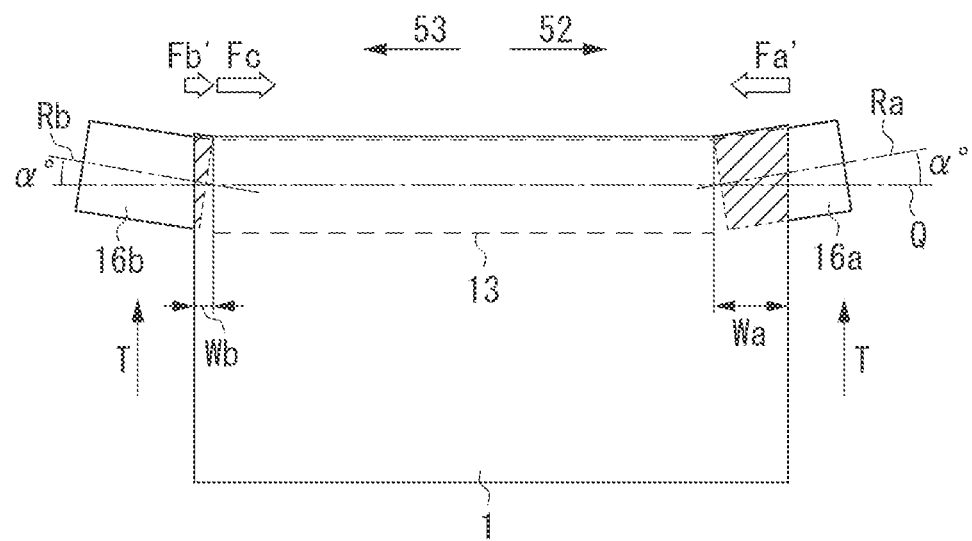

With reference to FIGS. 6A and 6B, the following describes the principle that lateral movement of the belt 1 is adjusted by the inclined rollers 16a and 16b when a force causing the belt shift is generated in the belt 1 because of misalignment of the attachment flatness in the intermediate transfer unit 120, a difference between the right and left outer circumferential lengths of the belt 1, and a difference between the right and left spring pressures. FIGS. 6A and 6B illustrate a relation between the amount of winding of the belt 1 around the inclined rollers 16a and 16b provided at both ends of the tension roller 4, returning forces, and a force causing the belt shift. The reinforcing tapes 12a and 12b, the inclined roller shafts 15a and 15b, and the tension roller shaft 8 are omitted to simplify the illustrations.

FIG. 6A illustrates an initial state where the belt 1 winds around the inclined rollers 16a and 16b at both ends of the tension roller 4 in the width direction by a predetermined equal amount of width W0. In this state, as described above, a returning force for returning the belt 1 to the center in the width direction is generated at the portions where the belt 1 winds around the inclined rollers 16a and 16b. Specifically, two different forces Fa and Fb act on the belt 1. Since both forces are balanced, the belt 1 does not move (not shift) in the width direction. In this state, the equilibrium of the relevant forces acting on the belt 1 in the width direction is represented by formula (1).

$$\text{Returning force Fa} = \text{Returning force Fb} \quad (1)$$

Suppose that, as illustrated in FIG. 6B, a force causing the belt shift Fc in the direction of the arrow 52 is generated in the belt 1 because of the above-described misalignment of the attachment flatness, the difference between the right and left outer circumferential lengths of the belt 1, etc. Then, the belt 1 moves in the direction of the arrow 52 by the force causing the belt shift Fc, increasing the amount of winding of the right side end of the belt 1 around the inclined roller 16a, and accordingly the returning force Fa has increased to a returning force Fa'.

As illustrated in FIGS. 6A and 6B, the amount of winding W0 increases to the amount of winding Wa. In the state illustrated in FIG. 6B where the amount of winding of the right side end of the belt 1 around the inclined roller 16a increases, the amount of winding of the left side end of the belt 1 around the inclined roller 16b decreases, and accordingly the returning force Fb has decreased to a returning force Fb'. Thus, the movement of the belt 1 in the width direction is restricted at a position where the above-described force causing the belt shift Fc and the returning forces Fa' and Fb' by the inclined rollers 16a and 16b at both ends are balanced. In this state, the equilibrium of the relevant forces acting on the belt 1 in the width direction is represented by formula (2).

$$\text{Force causing the belt shift Fc} + \text{Returning force Fb}' = \text{Returning force Fa}' \quad (2)$$

Based on the above-described principle, the functions of the inclined rollers 16a and 16b can adjust lateral movement of the belt 1 even when the force causing the belt shift Fc is generated in the belt 1.

Figure 7A:
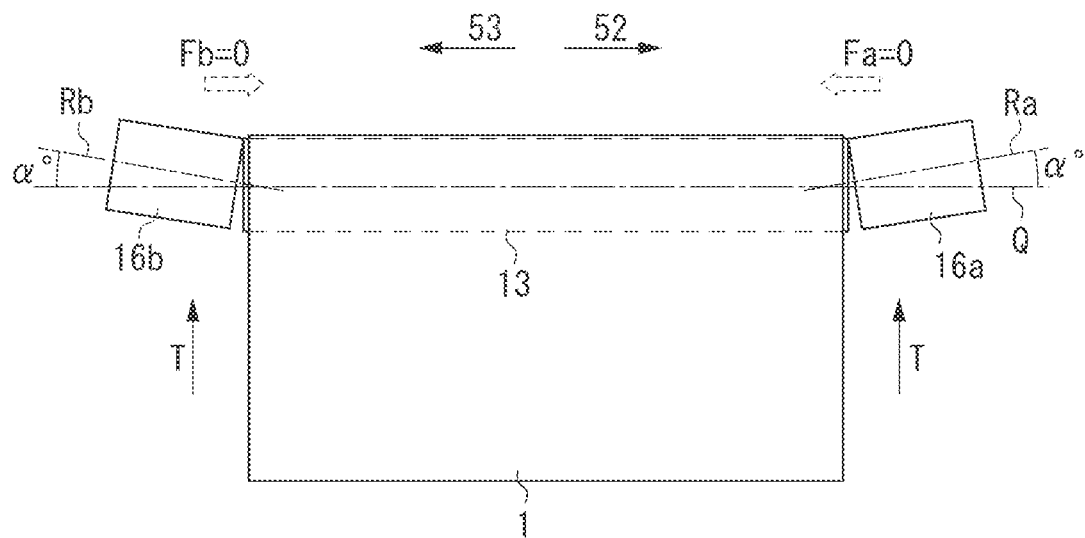
FIGS. 7A and 7B illustrate another configuration according to the first exemplary embodiment.

Although the state where the belt 1 winds around the inclined rollers 16a and 16b at both ends by an equal amount of width W0 is set as an initial state, a state where the distance between the inclined rollers 16a and 16b at both ends is larger than the width of the belt 1, and the belt 1 has not yet wound around the inclined rollers 16a and 16b, as illustrated in FIG. 7A, can also be set as an initial state. In this case, a returning force is not generated in the belt 1, and the equilibrium of the relevant forces acting on the belt 1 in the width direction is represented by formula (3).

$$\text{Returning force Fa} = \text{Returning force Fb } 0 \quad (3)$$

In this state, the movement of the belt 1 in the width direction is not generated.

Figure 7B:
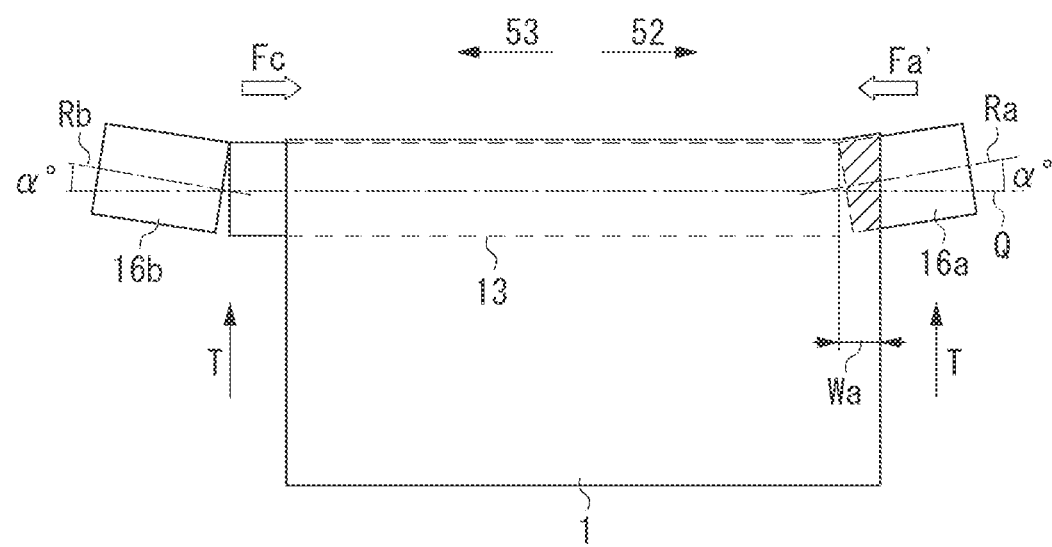

When the force causing the belt shift Fc in the direction of the arrow 52 is generated in the belt 1, the belt 1 moves in the direction of the arrow 52 and starts winding around the inclined roller 16a. As illustrated in FIG. 7B, the returning force Fa gradually increases with increasing amount of winding around the inclined roller 16a. Then, when the force causing the belt shift Fc and the returning force by the inclined roller 16a are balanced, the belt 1 stops moving in the width direction and the returning force Fa has increased to a returning force Fa'.

In this state, the equilibrium of the relevant forces acting on the belt 1 in the width direction is represented by formula (4).

$$\text{Force causing the belt shift Fc} = \text{Returning force Fa}' \quad (4)$$

Thus, setting a state where the width of the inclined rollers 16a and 16b at both ends is larger than the width of the belt 1, and the belt 1 has not yet wound around the inclined rollers 16a and 16b as an initial state also provides similar effects. With this configuration, the belt end has not yet wound around the inclined rollers 16a and 16b in the initial state, thereby providing an effect of reducing the load on the belt ends.

Figure 8:
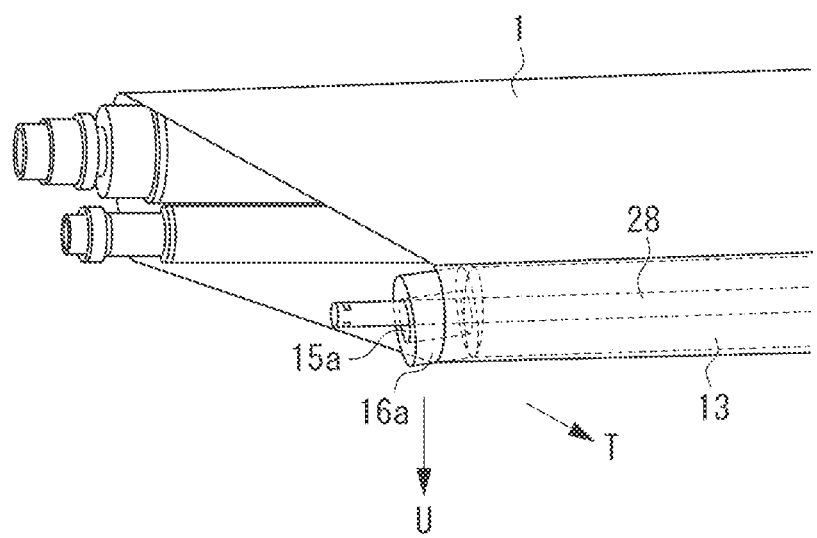
FIG. 8 is a perspective view illustrating a transfer unit according to the first exemplary embodiment.

Although, in the present exemplary embodiment, the rotating shaft of the inclined rollers 16a and 16b is inclined with respect to the rotating shaft of the tension roller 8 in a direction T (the tensional direction), the relevant rotating shaft may be inclined in other direction. For example, as illustrated in FIG. 8, inclining the relevant rotating shaft in a direction U (perpendicularly downward direction) also enables the belt 1 to wind around the inclined rollers 16a and 16b, obtaining a returning force for returning the belt 1 to the center.

The reinforcing tapes 12a and 12b are stuck for the purpose of improving the stiffness of the ends of the belt 1. If the stiffness of the belt 1 is weak, the ends of the belt 1 tensed by the biasing springs 11 will be extended. As a result, the contact pressure between the inclined rollers 16a and 16b and the belt 1 decreases, and the amount of slip between the inclined rollers 16a and 16b and the belt 1 increases, thereby decreasing the returning forces Fa and Fb. Therefore, sticking the reinforcing tapes 12 can improve the stiffness of the ends of the belt 1, preventing the decrease in the returning forces Fa and Fb of the inclined rollers 16a and 16b.

With the configuration in which the inner circumferential surfaces of the ends of the belt 1 directly wind around the inclined rollers 16a and 16b as in the present exemplary embodiment, it is not necessary to provide a projection (rib) at the ends of the belt 1. Not providing ribs enables the inner circumferential surface of the belt 1 to be flat, thereby reducing the number of parts of the intermediate transfer unit 120. Further, the process for sticking projections on the belt 1 is not necessary, thus enabling cost reduction.

According to the present exemplary embodiment, by providing the inclined rollers 16a and 16b (rotating members) at the ends of at least one stretching member, a force in the direction opposite to the lateral movement direction of the belt 1 can be generated. Thus, the belt 1 can be returned to the center simply when the ends of the belt 1 wind around the inclined rollers 16a and 16b. This eliminates the need of a complicated configuration, such as a frame which rotates around a rotating shaft on the outer circumferential surface of the belt 1, and enables lateral movement of the belt 1 to be adjusted with a simple configuration.

In the first exemplary embodiment, lateral movement of the belt 1 is adjusted by using the inclined rollers 16a and 16b having a cylindrical shape as rotating members. A second exemplary embodiment is characterized in using rotating members having a tapered shape. Other configurations are similar to those of the image forming apparatus according to the first exemplary embodiment, and identical elements are assigned with the same reference numeral.

Figure 9:
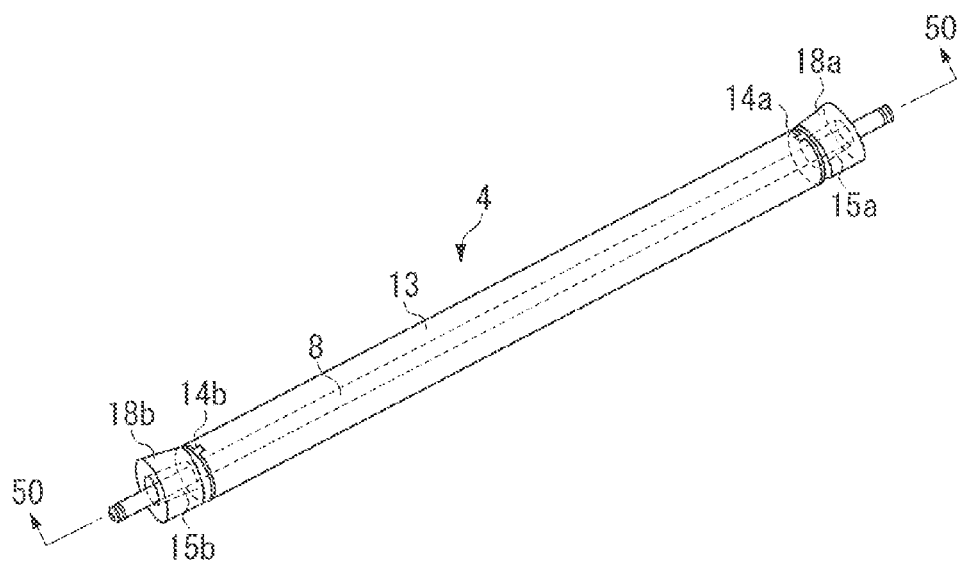
FIG. 9 is a perspective view illustrating a tension roller according to a second exemplary embodiment.
Figure 10A:
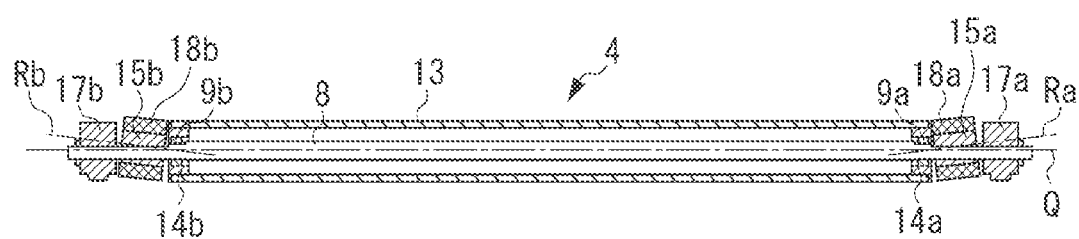
FIG. 10A is a cross sectional view illustrating the tension roller and its periphery taken along the arrows 50 in FIG. 9.
Figure 10B:
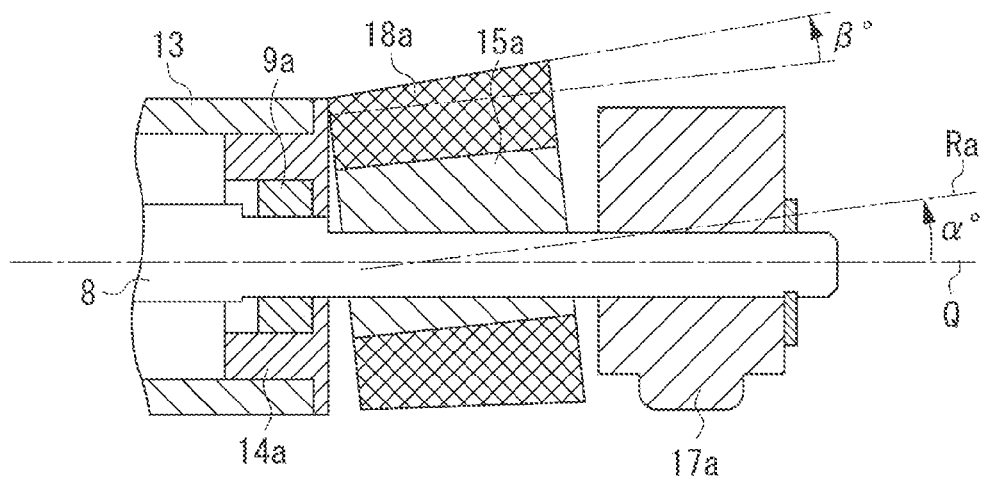
FIG. 10B is an enlarged view illustrating the right-hand side portion of the tension roller illustrated in FIG. 9A.

FIG. 9 is a perspective view illustrating the tension roller 4, which is a rotating member having a tapered shape according to the present exemplary embodiment. FIG. 10A is a cross sectional view illustrating the tension roller 4 and its periphery taken along the arrows 50 in FIG. 9, and FIG. 10B is an enlarged view illustrating the right-hand side portion (the side of the bearing holding hole 10a) of the tension roller 4 illustrated in FIG. 10A. Inclined tapered rollers 18a and 18b are provided at both ends of the sleeve 13 in the width direction as rotating members having a tapered shape.

The inclined roller shafts 15a and 15b are attached to the tension roller shaft 8 with a tilting angle of α° (α° =0.6 degrees) with respect to the rotating axis Q of the sleeve 13, in a state that the inclined roller shafts 15a and 15b are stopped rotating. The inclined tapered rollers 18 are rotatable by being engaged with the inclined roller shafts 15a and 15b. Therefore, the inclined tapered rollers 18a and 18b are rotatable around rotating shafts R different from the rotating axis Q of the sleeve 13. Each of the inclined tapered rollers 18a and 18b is provided with a tapered surface with a taper angle of β° (β° =0.6 degree), and therefore increases in outer diameter toward the outer side in the shaft direction.

The following describes the functions of the inclined tapered rollers 18a and 18b to return the belt 1 to the center in a state where the belt 1 winds around the inclined tapered rollers 18a and 18b.

Figure 11:
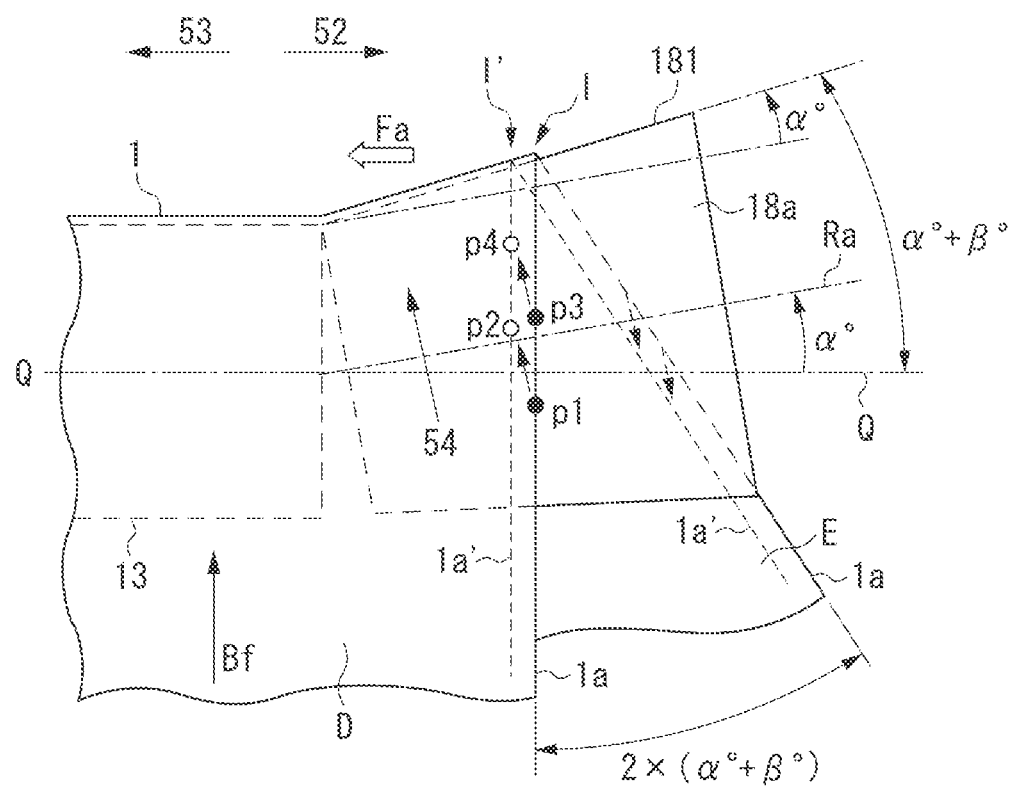
FIG. 11 illustrates a trace of the movement of a belt end according to the second exemplary embodiment.

FIG. 11 is an enlarged view illustrating a portion where the belt 1 winds around the inclined tapered roller 18a. The reinforcing tapes 12a and 12b, the inclined roller shafts 15a and 15b, and the tension roller shaft 8 are omitted to simplify the illustration. The operation of the belt 1 will be described below with reference to FIG. 11.

When the inclined tapered roller 18a rotates in the direction of the arrow 54 around the rotating shaft Ra, the end 1a of the belt 1 rotates and moves while receiving the force of the tapered roller 18a, and thus, the end 1a of the belt 1 winds around the inclined tapered roller 18a. Then, the belt 1 moves toward the outer side in the width direction (the direction of the arrow 52 in FIG. 11) with a winding angle of about 2×(α+β)°. Specifically, as illustrated in FIG. 11, the inclined tapered roller 18a enables the end of the belt 1 to wind around the outer side, in the width direction, of an entry position where the belt 1 enters the inclined tapered roller 18a.

The following describes a trace of the edge 1a of the end of the belt 1 with reference to FIG. 11. The inclined tapered roller 18a rotates in the direction of the arrow 54'. At a certain minute time, as the inclined tapered roller 18a rotates, the point p1 on the edge 1a of the belt 1 on the D side moves to a point p2', and the point p3 moves to a point p4' in a rotational direction 54' of the inclined tapered roller 18a.

Similarly, a point on the edge of the belt 1 on the E side moves in the rotational direction 54' of the inclined tapered roller 18a. The edge 1a of the belt 1 moves to a position 1a'. As a result, the belt 1 has relatively moved in the direction of the arrow 53, from a position I to a position I'. This means that, with the function of the tapered roller 18a, at the portion where the belt 1 winds around the inclined tapered roller 18a, a force Fa for returning the belt 1 to the center is constantly generated by the inclined tapered roller 18a.

Thus, in the present exemplary embodiment, it is possible that the belt 1 winds around the tension roller 4 with a winding angle which equals the sum of the tilting angle (α°) and the taper angle (β°) of the inclined roller shaft 15. As a result, the amount of movement in the direction of the arrow 53 from the edge 1a to the edge 1a' increases on the E side of the belt 1. In other words, the larger the winding angle, the larger the amount of movement toward the center. Even with the same tilting angle of the rotating shaft of the inclined rollers 15, the returning forces Fa and Fb obtained are larger than those obtained in the first exemplary embodiment.

Providing larger returning forces Fa and Fb in this way enables adjusting lateral movement, for example, with a small amount of winding around the inclined tapered rollers 18a and 18b. Further, since lateral movement can be adjusted even when a large force causing the belt shift is generated in the intermediate transfer unit 120, it is possible to alleviate tolerances for above-described misalignment in the intermediate transfer unit 1, the difference between the right and left outer circumferential lengths of the belt 1, and the difference between the right and left spring pressures.

In the first exemplary embodiment, lateral movement of the belt 1 is adjusted by using rotating members having a cylindrical shape. A third exemplary embodiment is characterized in forming friction layers 19 (19a and 19b) on the surface of the rotating members. Other configurations are similar to those of the image forming apparatus according to the first exemplary embodiment, and identical elements are assigned with the same reference numeral.

Figure 12A:
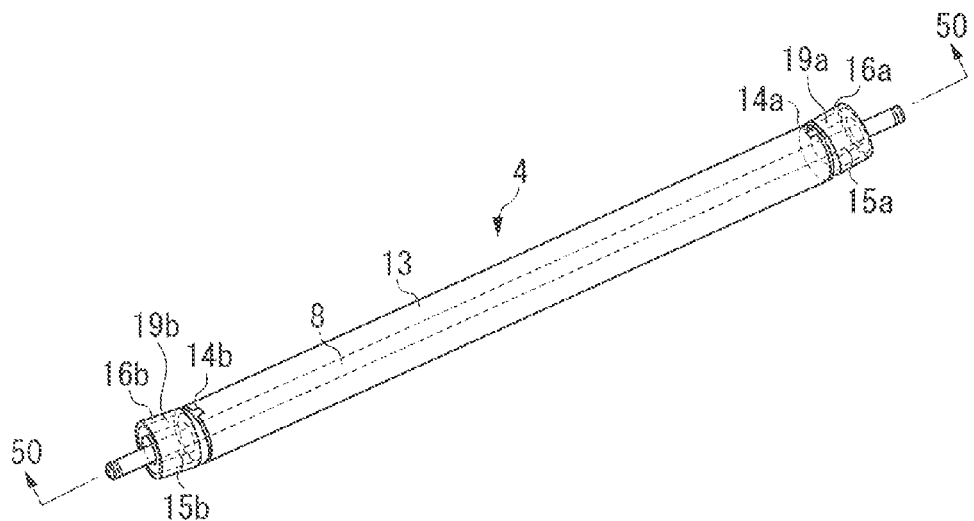
FIG. 12A is a perspective view illustrating a tension roller and rotating members according to a third exemplary embodiment of the present disclosure.
Figure 12B:
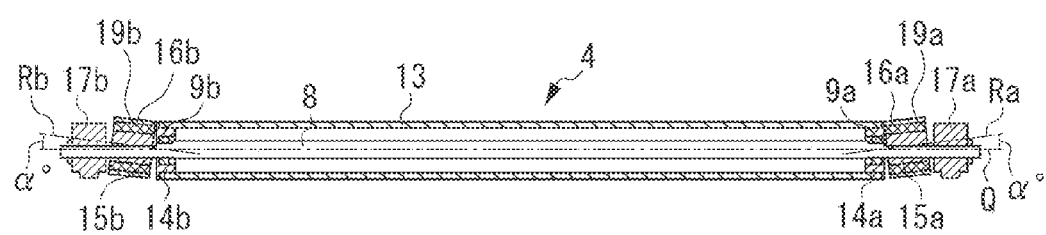
FIG. 12B is a cross sectional views illustrating the tension roller and its periphery taken along the arrows 50 in FIG. 12A.

FIG. 12A is a perspective view illustrating the tension roller 4 and the friction layers 19a and 19b according to the present exemplary embodiment. FIG. 12B is cross sectional view illustrating the tension roller 4 and its periphery taken along the arrows 50 in FIG. 12A.

As illustrated in FIGS. 12A and 12B, the friction layer 19a is formed on the surface of the inclined roller 16a. (Similarly, the friction layer 19b is formed on the surface of the inclined rollers 16b.) Specifically, the friction layers 19a and 19b have a higher friction coefficient than that of the outer circumferential surface of the sleeve 13.

The friction layers 19a and 19b may be made of silicone rubber, polyurethane rubber, etc. Silicone rubber or polyurethane rubber may be stuck on the surface of the inclined rollers 16a and 16b in a tape form, or the inclined rollers 16a and 16b may be made of silicone rubber or polyurethane rubber.

The friction layers 19a and 19b reduces the amount of slip between the belt 1 and the inclined rollers 16a and 16b at the portions where the belt 1 winds around the inclined rollers 16a and 16b, respectively. Therefore, when the belt 1 is conveyed by the inclined rollers 16a and 16b with a certain winding angle, the amount of slip is small. In this case, therefore, a returning force generated in the belt 1 is larger than that in a case of the inclined rollers without the friction layers 19a and 19b, resulting in larger forces Fa and Fb for returning the belt 1 to the center.

Providing larger returning forces Fa and Fb in this way enables adjusting lateral movement, for example, with a small amount of winding around the inclined rollers 16. Further, since lateral movement can be adjusted even when a large force causing the belt shift is generated in the intermediate transfer unit 120, it is possible to alleviate tolerances for above-described misalignment in the intermediate transfer unit 1, the difference between the right and left outer circumferential lengths of the belt 1, and the difference between the right and left spring pressures.

The friction layers 19 according to the present exemplary embodiment may be formed on the inclined tapered rollers 18, which are rotating members according to the second exemplary embodiment.

In the first exemplary embodiment, the rotating members and the belt supporting members contact the inner circumferential surface of the belt 1, and rotate independently from each other. A fourth exemplary embodiment is characterized in that the rotating members and the belt supporting members are engaged with each other, and rotatable at the same angular speed. Other configurations are similar to those of the image forming apparatus according to the first exemplary embodiment, and identical elements are assigned with the same reference numeral.

Figure 13A:
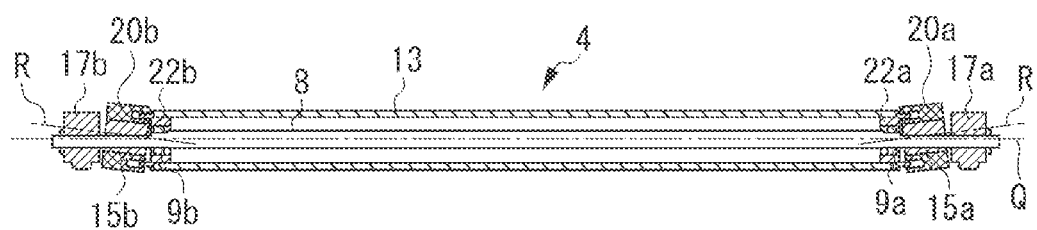
FIG. 13A is a cross sectional view illustrating a tension roller according to a fourth exemplary embodiment of the present disclosure.
Figure 13B:
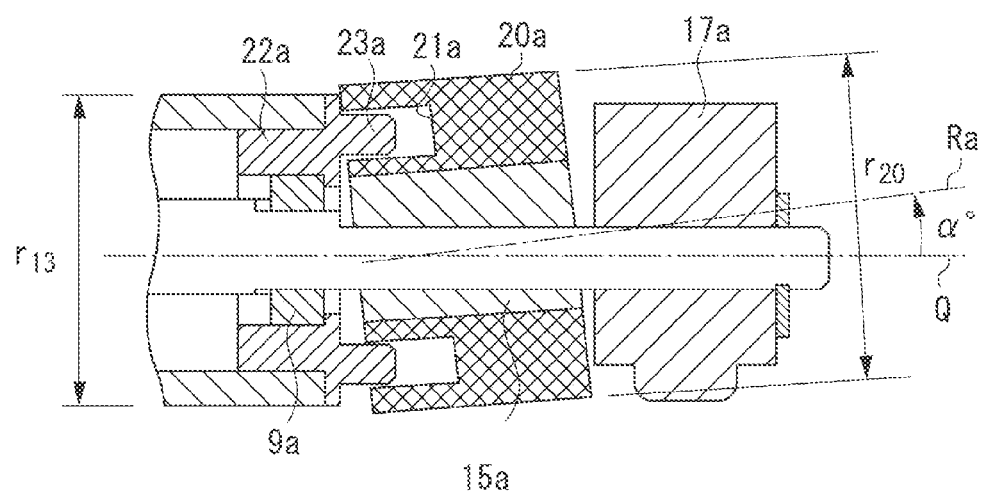
FIG. 13B is an enlarged view illustrating the right-hand side portion of the tension roller illustrated in FIG. 13A.

FIG. 13A is a cross sectional view illustrating the tension roller 4 according to the present exemplary embodiment, and FIG. 13B is an enlarged view illustrating the right-hand side portion of the tension roller 4 illustrated in FIG. 13A. The inclined roller shaft 15a is attached to the tension roller shaft 8 with a tilting angle of α° with respect to the rotating axis Q of the sleeve 13 (a belt supporting member), in a state that the inclined roller shaft 15a is stopped rotating. An inclined roller 20a having an outer diameter r20 larger than an outer diameter r13 of the sleeve 13 is provided, by being engaged with the inclined roller shaft 15a.

Further, engaging a boss 23a provided on a flange 22a (engaged with the sleeve 13) with a boss hole 21 provided on the inclined roller 20a causes the sleeve 13 to be rotatable in association with the inclined roller 20a. In this case, the sleeve 13 rotates around the rotating axis Q, and the inclined roller 20a rotates around the rotating shaft Ra, i.e., the sleeve 13 and the inclined roller 20a have different rotating shafts, forming a universal joint for mutually transferring shaft rotation with a certain angle.

In this case, since the inclined roller 20a has a larger outer diameter than the sleeve 13, the inclined roller 20a protrudes from the sleeve 13 in the direction T (the tensional direction). Therefore, the inclined roller 20a is driven by the driving force of the belt 1 (not illustrated). The sleeve 13 is driven by the driving force of the inclined roller 20a at the same angular speed. Since the sleeve 13 having a smaller outer diameter than the inclined rollers 20a rotates at the same angular speed as the inclined roller 20a, the circumferential speed of the outer circumference of the sleeve 13 is lower than that of the outer circumference of the inclined rollers 20a. Specifically, the circumferential speed of the outer circumference of the sleeve 13 is lower than the speed of the belt 1. This means that a slip in the rotational direction is generated between the outer circumference of the sleeve 1 and the belt 1. As a result, the gripping force between the sleeve 13 and the belt 1 is smaller than that between the inclined roller 20a and belt 1. Thus, a relative difference in gripping force between the sleeve 13 and the inclined roller 20a enables obtaining larger effects from the returning force Fa for returning the belt 1 to the center generated by the inclined roller 20a.

Providing a lager returning force in this way enables adjusting lateral movement, for example, with a small amount of winding around the inclined roller 20a. Further, since lateral movement can be adjusted even when a large force causing the belt shift is generated in the intermediate transfer unit 120, it is possible to alleviate tolerances for above-described misalignment in the intermediate transfer unit 1, the difference between the right and left outer circumferential lengths of the belt 1, and the difference between the right and left spring pressures.

In the first exemplary embodiment, the rotating members are provided at both ends of the tension roller 4 in the width direction to adjust lateral movement of the belt 1. A fifth exemplary embodiment is characterized in that the rotating members are provided at only one end so that the belt 1 is intentionally moved to only one end in the width direction. Other configurations are similar to those of the image forming apparatus according to the first exemplary embodiment, and identical elements are assigned with the same reference numeral.

Figure 14A:
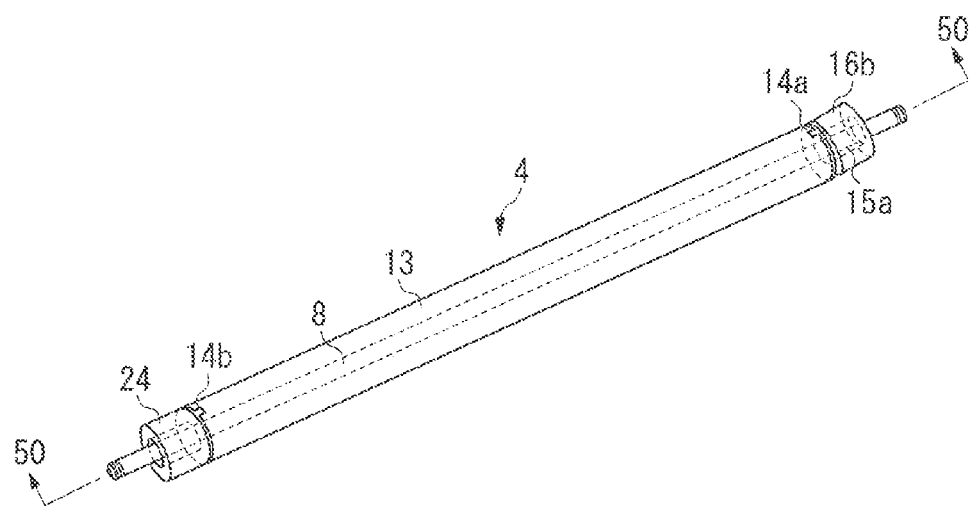
FIG. 14A is a perspective view illustrating a tension roller according to a fifth exemplary embodiment of the present disclosure.
Figure 14B:
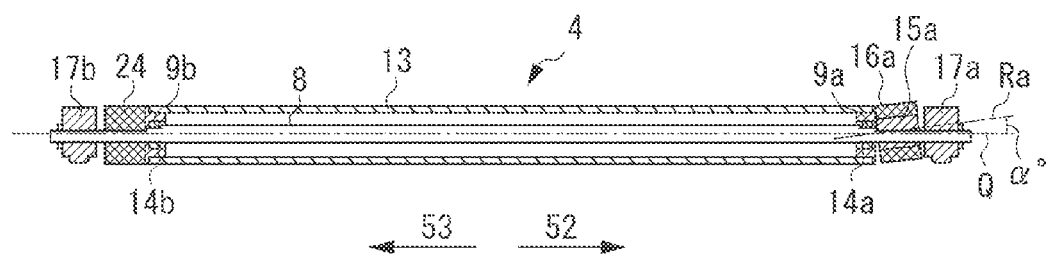
FIG. 14B is a cross sectional views illustrating the tension roller taken along the arrows 50 in FIG. 14A.
Figure 15A:
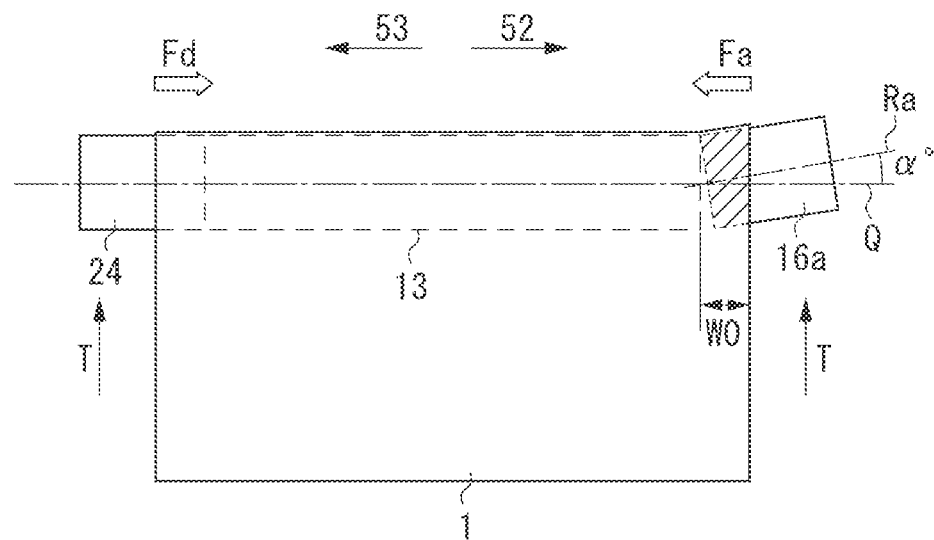
FIGS. 15A and 15B illustrate a relation between forces causing the belt shift and a returning force by an inclined roller.
Figure 15B:
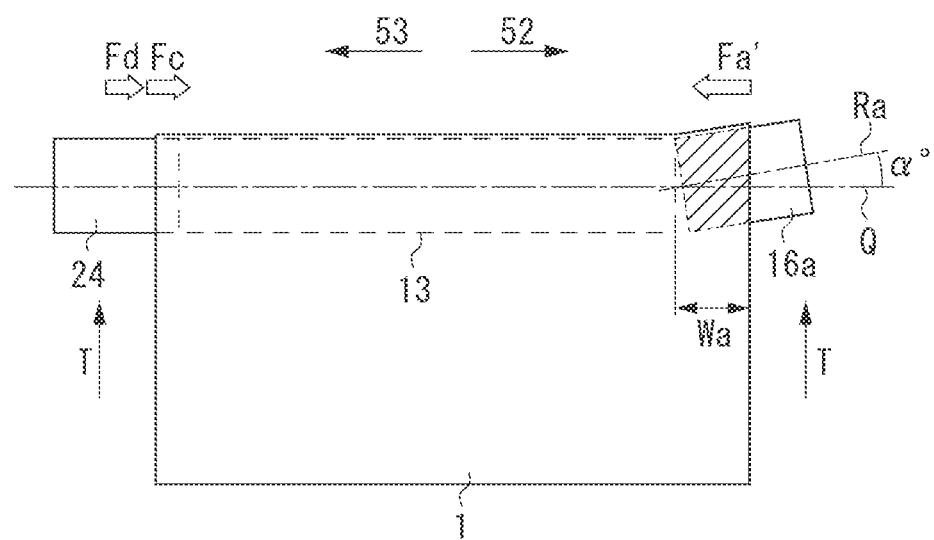

The present exemplary embodiment will be described below with reference to FIGS. 14A, 14B, 15A, and 15B. FIG. 14A is a perspective view illustrating the tension roller 4 according to the present exemplary embodiment, and FIG. 14B is a cross sectional view illustrating the tension roller 4 taken along the arrows 50. FIGS. 15A and 15B illustrate a relation between forces applied to the belt 1, which are a force causing the belt shift Fd by the difference between the right and left spring pressures and the returning force Fa by the inclined roller 16a.

In this exemplary embodiment, the right and left spring pressures to the tension roller 4 are differentiated. With the right and left biasing springs 11 for applying tension to the belt 1 in the intermediate transfer unit 120 illustrated in FIG. 2, the pressure of the spring 11a is set to a small value and the pressure of the spring 11b is set to a large value. When a driving force is applied to the belt 1 for conveyance in this state, the belt 1 is constantly shifted in the direction of the arrow 52. Specifically, the intermediate transfer unit 120 is configured to constantly shift the belt 1 only in the direction of the arrow 52 (toward one end in the width direction).

At only one end of the tension roller 4, the inclined roller shaft 15a is attached to the tension roller shaft 8 with a tilting angle of α° with respect to the rotating shaft of the sleeve 13, in a state that the inclined roller shaft 15a is stopped rotating. The inclined roller 16a (rotating member) is provided by being engaged with inclined roller shaft 15a. Therefore, the inclined roller 16a is rotatable around the rotating shaft Ra. At the other end of the tension roller 4, a roller 24 is provided rotatably around the rotating axis Q, by being engaged with the tension roller shaft 8. Similar to the first exemplary embodiment, at the portion where the belt 1 winds around the inclined roller 16a, the belt 1 winds around the inclined roller 16a and is shifted in the direction of the arrow 53.

As illustrated in FIG. 15A, in a state where the force causing the belt shift Fc is not generated because of misalignment, etc., the force causing the belt shift Fd by the difference between the right and left spring pressures and the returning force Fa by the inclined roller 16a are balanced. In this state, the equilibrium of the relevant forces acting on the belt 1 in the width direction is represented by formula (5).

Force causing the belt shift Fd=Returning force Fa    (5)

In this case, the belt 1 winds around the inclined roller 16a by an amount of width W0.

In this case, when the force Fc is generated in the direction of the arrow 52 because of misalignment, etc., the belt 1 moves in the direction of the arrow 52. As a result, the amount of winding of the belt 1 around the inclined roller 16a increases to the amount of winding Wa, and accordingly the returning force Fa by the inclined roller 16a has increased to a returning force Fa'. In this state, the equilibrium of the relevant forces acting on the belt 1 in the width direction is represented by formula (6).

Force causing the belt shift Fd+Force causing the belt shift Fc =Returning force Fa'    (6)

where the relevant forces are balanced.

Providing in this way the inclined roller 16a only on the side of the tension roller 4 to which the belt 1 is to be shifted in the width direction (lateral movement) enables adjusting lateral movement of the belt 1. Thus, further simplification of configuration and further cost reduction can be achieved.

Although, in the above-described exemplary embodiments, the tension roller 8 is provided with rotating members (lateral movement adjustment devices), the rotating members may be provided with other stretching members, i.e., the drive roller 2 and the driven roller 3. Further, a plurality of stretching members may be provided with rotating members.

Although, in the above-described exemplary embodiments, the intermediate transfer unit 120 uses three rollers as a plurality of stretching members, the intermediate transfer unit 120 may include at least two rollers, which are the drive roller 2 and the tension roller 4.

Although, in the above-described exemplary embodiments, the intermediate transfer unit 120 is used as a belt conveyance apparatus, the configuration is not limited thereto. The belt conveyance apparatus may include a photosensitive member belt for forming an electrostatic latent image, a transfer material conveyance belt for conveying a transfer material, and a fixing belt for fixing a toner image onto the transfer material. The belt conveyance apparatus according to the present disclosure may be applied to an apparatus other than an image forming apparatus, such as a belt conveyor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-127138 filed Jun. 4, 2012, which is hereby incorporated by reference herein in its entirety.

What is claimed is:

1. A belt conveyance apparatus comprising:
an endless belt configured to be rotationally movable;
a stretching member including a shaft and a contact portion configured to contact an inner circumferential surface of the belt;
an adjustment device configured to adjust a lateral movement of the belt in a width direction perpendicularly intersecting with a rotational direction of the belt; and
a bearing configured to directly support an edge of one end side of the shaft of the stretching member with respect to the width direction,
wherein the adjustment device includes a rotating member rotating in contact with the inner circumferential surface of the belt at the one end side of the shaft of the stretching member in the width direction, a rotating axis of the rotating member being inclined with respect to the shaft of the stretching member, and
wherein, the rotating member is provided between the contact portion and the bearing with respect to the width direction,
wherein, in a case where the belt shifts to the one end side, the rotating member generates a force on the belt to shift the belt away from the one end side,
wherein the rotating member has a cylindrical shape having a constant outer diameter, and
wherein an innermost outer diameter of the rotating member in the width direction is equal to or greater than an outer diameter of an end of the stretching member in the width direction.

2. The belt conveyance apparatus according to claim 1, wherein the adjustment device includes an inclined axis as the rotating axis of the rotating member, the inclined axis being supported by the shaft of the stretching member and inclined with respect to the shaft of the stretching member.

3. The belt conveyance apparatus according to claim 1, wherein the stretching member includes a supporting member configured to support the contact portion, and a supporting member bearing engaged with the supporting member,
wherein the contact portion is in a sleeve shape.

4. The belt conveyance apparatus according to claim 1, wherein the adjustment device includes another rotating member rotating in contact with the inner circumferential surface of the belt on the other end said of the stretching member in the width direction.

5. The belt conveyance apparatus according to claim 4, wherein a distance between the rotating member and the other rotating member in the width direction is greater than a length of an contact area of the stretching member in contact with the belt in the width direction.

6. The belt conveyance apparatus according to claim 1, wherein the rotating member includes a friction layer having a greater friction coefficient than that of a contact area of the stretching member in contact with the belt in the width direction.

7. The belt conveyance apparatus according to claim 1, wherein an area of the belt in contact with the rotating member includes a flat surface.

8. An image forming apparatus comprising:
an image bearing member configured to bear a toner image; and
a transfer unit configured to transfer the toner image formed on the image bearing member onto a transfer material, the transfer unit including:
an endless belt configured to be rotationally movable;
a stretching member including a shaft and a contact portion configured to contact an inner circumferential surface of the belt;
a bearing configured to directly support an edge of one end side of the shaft of the stretching member with respect to the width direction; and
an adjustment device configured to adjust a lateral movement of the belt in a width direction perpendicularly intersecting with a rotational direction of the belt; and
wherein the adjustment device includes a rotating member rotating in contact with the inner circumferential surface of the belt at the one end side of the shaft of the stretching member in the width direction, a rotating axis of the rotating member being inclined with respect to the shaft of the stretching member, and wherein, the rotating member is provided between the contact portion and the bearing with respect to the width direction, wherein, in a case where the belt shifts to the one end side, the rotating member generates a force on the belt to shift the belt away from the one end side, wherein the rotating member has a cylindrical shape having a constant outer diameter, and wherein an innermost outer diameter of the rotating member in the width direction is equal to or greater than an outer diameter of an end of the stretching member in the width direction.

9. The belt conveyance apparatus according to claim 8, wherein the adjustment device includes an inclined axis as the rotating axis of the rotating member, the inclined axis being supported by the shaft of the stretching member and inclined with respect to the shaft of the stretching member.

10. The belt conveyance apparatus according to claim 8, wherein the stretching member includes a supporting member configured to support the contact portion, and a supporting member bearing engaged with the supporting member, wherein the contact portion is in a sleeve shape.

11. The image forming apparatus according to claim 8, wherein the adjustment device includes another rotating member rotating in contact with the belt on the other end side of the stretching member in the width direction.

* * * * *